United States Patent [19]

Nelson et al.

[11] Patent Number: 4,465,616
[45] Date of Patent: Aug. 14, 1984

[54] FORMULATION OF ELECTRICALLY CONDUCTIVE PLASTICS

[75] Inventors: Jordan R. Nelson, Trenton, N.J.; William K. Wissing; Victor S. Dunn, both of Indianapolis, Ind.

[73] Assignee: RCA Corporation, New York, N.Y.

[21] Appl. No.: 541,494

[22] Filed: Oct. 12, 1983

Related U.S. Application Data

[63] Continuation of Ser. No. 231,291, Feb. 4, 1981, abandoned.

[51] Int. Cl.³ ............................................. H01B 1/06
[52] U.S. Cl. ................................... 252/511; 264/105; 358/342; 358/343; 358/344; 524/495
[58] Field of Search ................ 523/174, 181; 358/342, 358/343, 344, 129, 127; 524/495, 496; 274/41 A, 1 R; 346/151, 77 E; 264/105, 106

[56] References Cited

U.S. PATENT DOCUMENTS 3,842,194 10/1974 Clemens .............................. 179/100
4,228,050 10/1980 Martin et al. ...................... 274/41 A
4,396,660 8/1983 Hatu et al. ........................... 252/511

FOREIGN PATENT DOCUMENTS 137631 2/1947 Austria .

Primary Examiner—Josephine Barr
Attorney, Agent, or Firm—Birgit E. Morris; R. Hain Swope

[57] ABSTRACT

A method for obtaining a capacitive information disc record conductive molding composition having a desired melt viscosity wherein the conductive molding composition comprises carbon black and a plastic molding resin. The method comprises the steps of measuring the surface area of the carbon black particles; determining the relationship of the amount by weight of carbon black and the surface area of the carbon black particles to the melt viscosity of the conductive molding composition; and formulating the conductive molding composition by having carbon black present in an amount which is in accord with the relationship for the desired conductive molding composition melt viscosity.

7 Claims, No Drawings

FORMULATION OF ELECTRICALLY CONDUCTIVE PLASTICS

This application is a continuation of application Ser. No. 231,291 filed Feb. 4, 1981, abandoned.

This invention relates to a method for preparing a conductive molding composition which contains carbon black for use in capacitive information disc records

BACKGROUND OF THE INVENTION

Clemens in U.S. Pat. Nos. 3,842,194, 3,842,217 and 3,909,517 has described a capacitive information disc record comprising a molded plastic disc record having audio and video information in the form of geometric variations in a spiral groove in the disc record surface. These disc records are overcoated with a conductive material, which acts as a first electrode, and then further overcoated with a dielectric layer. A metal-tipped stylus acts as the second electrode of a capacitor and the information signals recorded in the disc record surface are recovered as variations in capacitance between the stylus and the disc record surface. Relative motion is established between the disc record surface and the stylus during information recovery. The recovered information signals are processed to reconstitute the audio and video information.

Capacitive information disc records have also been developed which do not require a grooved surface. With this type of disc record the stylus is maintained in synchronization with an information pattern in the disc record surface by means of electrical signals on either side of the information track rather then physically by means of the groove walls.

Further developments, as described in the copending application of Fox et al., "A Conductive Video Disc," Ser. No. 105,550, filed Dec. 20, 1979, have led to a conductive capacitive information disc record which includes a molding resin such as a vinyl chloride homopolymer or copolymer and a sufficient amount of conductive particles, such as carbon black, so that the disc record can provide capacitance readout. The conductive capacitive information disc record may be employed with either the grooved or nongrooved information disc record system. This development has eliminated the need for coatings of conductive metal and dielectric on the disc record.

The conductivity of the molded disc record is generally directly related to the amount of conductive carbon particles added to the molding composition. However, large quantities of fillers, such as carbon black, decrease the processability of a molding composition and increase the brittleness of the molded article. The amount of conductive carbon particles which must be added for the conductive video disc record must be sufficient to reduce the bulk resistivity to below about 500 ohm-centimeters at about 900 megahertz (MHz), preferably below 100 ohm-centimeters at about 900 MHz and more preferably below about 5 ohm-centimeters at about 900 MHz. Thus, for example, a molding composition containing Ketjenblack EC carbon black particles (a product of Akzo Chemie) in amounts of from about 10 percent to about 20 percent by weight has the desired conductivity and processability.

Whipple et al. in a copending application entitled "Method for Preparing a Molding Composition," Ser. No. 231,287, which was filed concurrently and is incorporated hereby by reference, teaches a method for preparing conductive molding compositions which includes blending molding compositions according to their melt viscosities. The Whipple et al. method may be employed to overcome batch-to-batch carbon black variations. They have found that the melt viscosity can be related to the performance properties of the capacitive information disc record.

In order to reliably mass-produce the conductive plastic capacitive information disc records, it is necessary to overcome batch-to-batch carbon black nonuniformities. These variations affect the signal-to-noise ratio of both the audio and video signals. It would therefore be desirable to develop a method of overcoming batch-to-batch carbon black variability which relates to the properties of the carbon black itself to those of the capacitive information disc record.

SUMMARY OF THE INVENTION

We have found that the surface area of the carbon black particles may be used to prepare conductive molding compositions having a desired melt viscosity.

DETAILED DESCRIPTION OF THE INVENTION

Whipple et al., in their aforementioned copending application, have shown that the melt viscosity of a conductive molding composition is related to the performance properties of a capacitive information disc record. The conductive molding composition contains carbon black and a molding resin, such as a homopolymer or copolymer of vinyl chloride. As a result, the properties of the starting materials can be employed to fabricate a capacitive information disc record having known performance properties, such as video carrier signal-to-noise ratio (VCN) and audio carrier signal-to-noise ratio (ACN). The apparent melt viscosity ($\eta$) is known to vary directly with the shear stress ($\tau$) and inversely with the shear rate ($\dot{\gamma}$) and may be expressed by the following formula $$\eta = \tau/\dot{\gamma} \qquad \text{(Equation 1)}$$

The higher the carbon black loading, the higher the temperature which must be employed to compound and mold the conductive molding composition. The upper temperature limit occurs when there is significant decomposition of the molding resin. The decomposition temperature thus serves to determine the maximum carbon black loading which can be accommodated. Whipple et al. found that, in general, the preferred shear stress at 200° C. for a conductive molding composition comprising carbon black and a vinyl chloride homopolymer molding resin at a shear rate of 0.625 sec$^{-1}$ should be preferably between about 10 and 17 pounds per square inch (psi), more preferably between about 11 and 14 psi. This preferred shear stress results in the preferred combination of performance properties of a consumer capacitive electronic disc capacitive information disc record.

The surface area of carbon black particles may be determined by any method known in the art. See Medalia et al., "Carbon Blacks", in Characterization of Powder Surfaces, edited by G. D. Parfilt and K. S. W. King, Academic Press, London, 1976, Chap. 7, for a general discussion of carbon black surface area determination methods. The preferred method is a nitrogen adsorption method. Another method is to employ cetyltrimethylammonium bromide (CTAB) as the adsorbant. The larger size of the CTAB molecule compared to the nitrogen molecule allows a more accurate determination of the carbon black particle surface area accessible to the large polymer molecules.

Often for a single family of carbon black, dibutyl phthalate (DBP) absorption values can be used instead of the surface area measurements. DBP values are a measure of particle and aggregate size. Generally, DBP values increase with decreasing particle size and increasing aggregate size, both of which often relate to surface area. See the aforementioned Medalia et. al. chapter for a discussion of DBP values and carbon blacks.

It is believed that the use of the carbon black particle surface area is advantageous because the surface area relates to the ability of the molding resin to interact with the carbon black. A large surface area enables current to flow between the conductive particles in an efficient manner.

We have found Equation 2 to be preferred in relating the melt viscosity ($\eta$), the surface area of the carbon black particles (SA) and the weight percent (W) of carbon black in the conductive molding composition:

$$\log \eta = k_1 + k_2 \times W + k_3 \times W \times SA \quad \text{(Equation 2)}$$

wherein $k_1$, $k_2$, and $k_3$ are empirically determined constants which may vary with the method chosen to determine carbon black particle surface area. The sum of the parts by weight of the carbon black and the molding resin remains constant. The constants, $k_1$, $k_2$ and $k_3$ can be determined by choosing a carbon black lot and measuring its surface area. The weight % carbon black is varied in a number of conductive molding compositions whose melt viscosities are measured. Log $\eta$ is plotted vs. W and regression analysis used to obtain $k_1$, $k_2$ and $k_3$.

An equation other than Equation 2 which may be used but which results in a poorer correlation between observed and calculated values of $\eta$ is Equation 3:

$$\log \eta = k_4 + k_5 \times W + k_6 \times SA \quad \text{(Equation 3)}$$

wherein $k_4$, $k_5$, and $k_6$ are constants empirically determined by the same method employed for Equation 2. The sum of the parts by weight of carbon black and molding resin are kept constant.

A simplified form of Equation 2 which may also be employed is shown as Equation 4:

$$\log \eta = k_7 + k_8 \times W \times SA \quad \text{(Equation 4)}$$

whereby $k_7$ and $k_8$ are constants empirically determined by the method employed for Equation 2. The sum of the parts by weight of carbon black and molding resin are kept constant.

For Equations 2-4, $\tau$ may be substituted for $\eta$ if $\dot{\gamma}$ is kept constant. However, the empirically determined constants $k_1$-$k_8$ may be different as a result of the substitution although the same general method is employed.

By considering both the parts by weight of carbon black and the surface area, good agreement has been found between the measured and observed melt viscosities of the conductive molding compositions. This agreement occurs for a carbon black of the same family type manufactured by a particular vendor. For example, for Ketjenblack EC there is considerable lot-to-lot variability so that the melt viscosity for conductive molding compositions having the same carbon black loading can be different for different lots. However, when the surface area is taken into account, all lots follow, for example, Equations 2-4 once the empirical constants have been determined. Furthermore, if corrections are made to the measured surface area for micropores in the carbon black particles not filled by the molding resin, then different families may be used with the same set of empirical constants. It is preferable for more accurate results to determine the empirical constants for each lot of carbon black having a different surface area.

Thus, once the effect of surface area on melt viscosity is known, conductive molding compositions having a certain melt viscosity can be reliably formulated from a carbon black whose particle surface area has been determined. In formulating a conductive molding composition, the parts by weight of additives such as stabilizers, flow modifiers, lubricants and the like is kept constant as is the sum of the parts by weight of the carbon black and molding resin. Only the relative amounts of the latter two ingredients are varied. Equations 2-4 hold under these constraints.

The method of determining surface area must be consistent since the empirical constants are dependent on the method. Thus, if nitrogen adsorption is used the empirical constants will be different than if dibutyl phthalate absorption is employed. However, any method for determining particle surface area should be applicable to the present invention.

For a capacitive information disc record the suitability of its conductive molding composition may be determined by measuring certain performance properties of the disc record which involve its electrical properties during playback. One property which measures the quality of the picture obtained from a capacitive information disc record is VCN. A carrier signal frequency of 5 megahertz (MHz) may be employed. The VCN should be as high as possible and at least 40 decibels (dB) for commercially acceptable video in a consumer capacitive electronic disc capacitive information disc record. This ratio generally increases as resistivity decreases.

The invention will be further illustrated by means of the following examples but it is to be understood that the invention is not meant to be limited to the details disclosed therein. In the examples parts and percentages are by weight.

EXAMPLE 1

The formulation shown in Table I were employed for these experiments.

TABLE 1

| Ingredients | Percent |
|---|---|
| 1. B. F. Goodrich Geon 110 × 346, a homopolymer of vinyl chloride having a weight averaged molecular weight of 46,200, a number averaged molecular weight of 23,300 and a $T_g$ of 80° C. | (91.0 - X) |
| 2. Akzo Chemie Ketjenblack EC carbon black | X |
| 3. Additives | 9.0 |

X = Carbon black weight percent from 8.5 to 19 in 1.5 percent increments.

Four lots of Ketjenblack EC carbon black were employed and are designated A-D in Table II which compiles data for carbon black surface area using both the nitrogen adsorption and dibutyl phthalate (DBP) absorption methods as well as shear stress ($\tau$) measurements at a constant shear rate ($\dot{\gamma}$).

TABLE II

| % Carbon Black | Carbon Black Lot | Surface Area N$_2$, m$^2$/g | Surface Area DBP, ml/100 g | Shear Stress ($\tau$) (lb/in$^2$), $\dot{\gamma}$ = 0.625 sec$^{-1}$, at 200° C. |
|---|---|---|---|---|
| 8.5 | A | 941 | 400 | 1.5 |
| 10.0 | A | 941 | 400 | 1.8 |
| 13.0 | A | 941 | 400 | 6.8 |
| 14.5 | A | 941 | 400 | 10.7 |
| 17.5 | B | 901 | 371 | 25.3 |
| 19.0 | B | 901 | 371 | 34.9 |
| 8.5 | C | 927 | 388 | 1.4 |
| 10.0 | C | 927 | 388 | 3.1 |
| 11.5 | C | 927 | 388 | 4.8 |
| 13.0 | C | 927 | 388 | 7.8 |
| 14.5 | C | 927 | 388 | 12.7 |
| 16.0 | C | 927 | 388 | 18.7 |
| 17.5 | C | 927 | 388 | 31.8 |
| 19.0 | C | 927 | 388 | 54.4 |
| 8.5 | D | 679 | 312 | 1.1 |
| 10.0 | D | 679 | 312 | 1.7 |
| 11.5 | D | 679 | 312 | 2.2 |
| 13.0 | D | 679 | 312 | 3.4 |
| 14.5 | D | 679 | 312 | 4.8 |
| 16.0 | D | 679 | 312 | 7.0 |
| 17.5 | D | 679 | 312 | 12.4 |
| 19.0 | D | 679 | 312 | 16.0 |

Regression analyses were run using the data in Table II with Equations 2 and 3 modified in that log $\tau$ at constant $\dot{\gamma}$ was employed rather than log $\eta$. Log $\tau$ was plotted against W for each equation and surface area measurement method. The results are shown in Table III.

TABLE III

| Equation | Surface Area Method | Constants | R$^2$ | S (psi) |
|---|---|---|---|---|
| 2 | N$_2$ | $k_1 = -9.5994 \times 10^{-1}$ | 0.990 | 1.12 |
|  |  | $k_2 = 4.6379 \times 10^{-2}$ |  |  |
|  |  | $k_3 = 1.0045 \times 10^{-4}$ |  |  |
| 3 | N$_2$ | $k_4 = -2.1682$ | 0.989 | 1.35 |
|  |  | $k_5 = 1.2914 \times 10^{-1}$ |  |  |
|  |  | $k_6 = 1.4669 \times 10^{-3}$ |  |  |
| 3 | DBP | $k_4 = -2.6541$ | 0.981 | 1.55 |
|  |  | $k_5 = 1.3256 \times 10^{-1}$ |  |  |
|  |  | $k_6 = 4.6093 \times 10^{-1}$ |  |  |

R is the linear regression coefficient and S is the standard deviation which measures how the individual data points (observed value of $\tau$ in psi) on average deviate from the calculated value of $\tau$ obtained from the equation used. These results indicate that Equation 2 gives better results using either R$^2$ or S as the criterion. The N$_2$ method appears to be somewhat more accurate that the DBP method in predicting the melt viscosity of a formulation. These results indicate that Equations 2 or 3 can be used to obtain a molding composition having the desired melt viscosity.

EXAMPLE 2

The formulations of Example I were used except that the carbon black employed was varied. Two batches of Ketjenblack EC, designated as E and F were employed. Also tested were four different carbon blacks available from the Cabot Corporation: CSX-150, two lots designated as G and H, CSX-175, designated as J, and CSX-176, designated as K. Their properties and $\tau$ values are shown in Table IV. The values of $\tau$ were obtained at 200° C. at $\dot{\gamma} = 0.625$ sec$^{-1}$.

TABLE IV

| % Carbon Black | Carbon Black Lot | Surface Area, N$_2$ m$^2$/g | Surface Area, DBP, ml/100 g | $\tau$ (lb/in$^2$) |
|---|---|---|---|---|
| 8.5 | E | 898 | 388 | 1.4 |
| 10.0 | E | 898 | 388 | 3.1 |
| 11.5 | E | 898 | 388 | 4.8 |
| 13.0 | E | 898 | 388 | 7.8 |
| 14.5 | E | 898 | 388 | 12.7 |
| 16.0 | E | 898 | 388 | 18.7 |
| 17.5 | E | 898 | 388 | 31.8 |
| 19.0 | E | 898 | 388 | 54.5 |
| 8.5 | F | 647 | 312 | 1.1 |
| 10.0 | F | 647 | 312 | 1.7 |
| 11.5 | F | 647 | 312 | 2.2 |
| 13.0 | F | 647 | 312 | 3.4 |
| 14.5 | F | 647 | 312 | 4.8 |
| 16.0 | F | 647 | 312 | 7.0 |
| 17.5 | F | 647 | 312 | 12.4 |
| 19.0 | F | 647 | 312 | 16.0 |
| 8.5 | G | 1419 | 328 | 1.9 |
| 10.0 | G | 1419 | 328 | 3.3 |
| 11.5 | G | 1419 | 328 | 5.1 |
| 13.0 | G | 1419 | 328 | 6.8 |
| 14.5 | G | 1419 | 328 | 10.3 |
| 16.0 | G | 1419 | 328 | 14.7 |
| 17.5 | G | 1419 | 328 | 17.9 |
| 19.0 | G | 1419 | 328 | 29.9 |
| 8.5 | H | 1366 | 325 | 1.5 |
| 10.0 | H | 1366 | 325 | 2.3 |
| 11.5 | H | 1366 | 325 | 3.4 |
| 13.0 | H | 1366 | 325 | 4.8 |
| 14.5 | H | 1366 | 325 | 6.3 |
| 16.0 | H | 1366 | 325 | 10.1 |
| 17.5 | H | 1366 | 325 | 12.8 |
| 19.0 | H | 1366 | 325 | 16.7 |
| 8.5 | J | 1485 | 359 | 2.5 |
| 10.0 | J | 1485 | 359 | 3.9 |
| 11.5 | J | 1485 | 359 | 6.0 |
| 13.0 | J | 1485 | 359 | 8.5 |
| 14.5 | J | 1485 | 359 | 12.4 |
| 16.0 | J | 1485 | 359 | 19.3 |
| 17.5 | J | 1485 | 359 | 29.5 |
| 19.0 | J | 1485 | 359 | 45.7 |
| 8.5 | K | 1459 | 338 | 2.7 |
| 10.0 | K | 1459 | 338 | 4.2 |
| 11.5 | K | 1459 | 338 | 5.8 |
| 13.0 | K | 1459 | 338 | 8.1 |
| 14.5 | K | 1459 | 338 | 11.1 |
| 16.0 | K | 1459 | 338 | 16.3 |
| 17.5 | K | 1459 | 338 | 27.3 |
| 19.0 | K | 1459 | 338 | 36.6 |

The structures of Ketjenblack EC and Cabot carbon blacks are different. The Ketjenblack EC particle structure resembles that of broken egg shells. The Cabot carbon blacks have particles with a spherial structure. These two structures have similar DBP numbers, but the Cabot carbon blacks have a greater surface area as measured by the nitrogen adsorption method.

The data of Table IV was employed with Equations 2 and 4 in which log $\tau$ at constant $\dot{\gamma}$ was substituted for log $\eta$. Log $\tau$ was plotted against W and the empirical constants were obtained by regression analysis. The results are shown in Table V. When the nitrogen adsorption method data was used for all six of the carbon blacks, a correction was made for the difference in surface area between Ketjenblack and Cabot carbon blacks. In the absence of any correction, the two types of carbon blacks each fell on a separate line. However, with the surface area correction, both types fell on the same line. For Equation 2, the surface area of the Cabot carbon blacks was corrected by subtracting 605 m$^2$/g. For Equation 4, 610 m$^2$/g was subtracted. These corrections were made for the estimated additional microporosity of the Cabot carbon blacks in which the micropores were not filled by molding resin because of the small size of the micropores. R is the regression coefficient and S is the standard deviation in psi.

TABLE V

| Equation | Surface Area Method | Constants | R | S (psi) |
|---|---|---|---|---|
| 2 | $N_2$(E & F) | $k_1 = -0.89903$<br>$k_2 = 0.04235$<br>$k_3 = 0.00011$ | 0.997 | 1.1 |
| 2 | $N_2$(G,H,J,K) | $k_1 = -0.53498$<br>$k_2 = -0.03161$<br>$k_3 = 0.00017$ | 0.990 | 1.1 |
| 2 | $N_2$(E,F,G,H,J,K) | $k_1 = 0.59209$<br>$k_2 = 0.01857$<br>$k_3 = 0.00011$ | 0.981 | 1.2 |
| 2 | DBP(E & F) | $k_1 = -0.89903$<br>$k_2 = 0.00181$<br>$k_3 = 0.00035$ | 0.997 | 1.1 |
| 2 | DBP(G,H,J,K) | $k_1 = -0.51024$<br>$k_2 = -0.03951$<br>$k_3 = 0.00043$ | 0.956 | 1.2 |
| 2 | DBP(E,F,G,H,J,K) | $k_1 = -0.45927$<br>$k_2 = 0.00749$<br>$k_3 = 0.00026$ | 0.937 | 1.3 |
| 4 | $N_2$(E & F) | $k_7 = -0.76124$<br>$k_8 = 147 \times 10^{-6}$ | 0.980 | 3.1 |
| 4 | $N_2$(G,H,J,K) | $k_7 = -0.59827$<br>$k_8 = 134 \times 10^{-6}$ | 0.993 | 2.5 |
| 4 | $N_2$(E,F,G,H,J,K) | $k_7 = -0.66504$<br>$k_8 = 139 \times 10^{-6}$ | 0.986 | 2.7 |
| 4 | DBP(E & F) | $k_7 = -0.94602$<br>$k_8 = 363 \times 10^{-6}$ | 0.997 | 3.1 |
| 4 | DBP(G,H,J,K) | $k_7 = -0.59268$<br>$k_8 = 325 \times 10^{-6}$ | 0.978 | 2.5 |
| 4 | DBP(E,F,G,H,J,K) | $k_7 = -0.69749$<br>$k_8 = 335 \times 10^{-6}$ | 0.966 | 2.7 |

EXAMPLE 3

The data and empirical coefficients of Equation 2 of Example 2 were employed to prepare a conductive molding composition having the desired $\tau$. The experimentally observed and calculated values of $\tau$ in the area of the preferred range of about 10–17 psi of Whipple et al. was investigated employing the empirical constants of Equation 2 for nitrogen (E,F,G,H, J,K) and DBP(E,F,G,H,J,K). The results are shown in Table VI. In the preferred $\tau$ range, the observed values were generally higher than the calculated values.

TABLE VI

| Equation 2 Values | $\tau$ Calculated | $\tau$ Observed |
|---|---|---|
| $N_2$(E,F,G,H,J,K) | 13.3 | 14.1 |
|  | 9.4 | 12.6 |
|  | 9.4 | 10.6 |
| DBP(E,F,G,H,J,K) | 11.4 | 15.1 |
|  | 13.3 | 12.6 |
|  | 8.9 | 11.4 |
|  | 8.0 | 10.7 |

We claim:

1. In a method of mass-producing conductive plastic capacitive information records by compression molding a composition comprising conductive carbon black particles, a molding resin comprising a homopolymer or copolymer of vinyl chloride and suitable additives compatible therewith, the improvement wherein the records are produced without batch-to-batch nonuniformity in predetermined performance properties resulting from variation in the physical properties of the carbon black by preparing each batch of said molding composition with a precise weight of carbon black determined by:
   (a) determining the melt viscosity of a conductive molding composition from which records having the desired preformance properties have been prepared, wherein the total weight percent of carbon black and resin in said composition and said batch is constant;
   (b) measuring the surface area of samples of carbon black to be utilized in a given batch of molding composition and determining the average surface area thereof; and
   (c) determining the precise weight percent of conductive carbon black required for said batch of molding composition according to a relationship selected from $$\log n = k_1 + k_2 \times W + k_3 \times W \times SA,$$

$$\log n = k_4 + k_5 \times W \times k_6 \times SA, \text{ and}$$

$$\log n = k_8 \times W \times SA$$

wherein n is the melt viscosity provided in step (a), W is the weight percent of the carbon black present in said composition, SA is the average surface area of the carbon black particles and each of $k_1$ through $k_7$ is an empirical constant, wherein said constants correlate with the method utilized in step (b) to determine surface area.

2. A method in accordance with claim 1 wherein the surface area is measured by the nitrogen adsorption method.

3. A method in accordance with claim 1 wherein the surface area is measured by the cetyltrimethylammonium bromide adsorption method.

4. A method in accordance with claim 1 wherein the surface area is measured by the dibuthyl phthalate absorption method.

5. A method in accordance with claim 1, wherein said relationship is $$\log n = k_1 + k_2 \times W + k_3 \times W \times SA.$$

6. A method in accordance with claim 1, wherein said relationship is $$\log n = k_4 + k_5 \times W + k_6 \times SA.$$

7. A method in accordance with claim 1, wherein said relationship is $$\log n = k_7 + k_8 \times W \times SA.$$

* * * * *